US008023975B2

(12) United States Patent
Wickman et al.

(10) Patent No.: US 8,023,975 B2
(45) Date of Patent: Sep. 20, 2011

(54) SECONDARY STATUS DISPLAY FOR MOBILE DEVICE

(75) Inventors: Marianna Wickman, Seattle, WA (US); Feridoon Malekzadeh, Bellevue, WA (US); Valerie Goulart, Seattle, WA (US); Jennifer Sadler, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 275 days.

(21) Appl. No.: 12/409,473

(22) Filed: Mar. 23, 2009

(65) Prior Publication Data

US 2010/0240402 A1 Sep. 23, 2010

(51) Int. Cl.
*H04W 4/00* (2009.01)

(52) U.S. Cl. ........................................ 455/466; 455/566

(58) Field of Classification Search .................. 455/466, 455/566
See application file for complete search history.

(56) References Cited

U.S. PATENT DOCUMENTS

| | | | |
|---|---|---|---|
| 7,016,704 B2 | 3/2006 | Pallakoff | |
| 7,252,511 B2 | 8/2007 | Santos et al. | |
| 7,400,913 B2 | 7/2008 | Richter et al. | |
| 7,460,108 B2 * | 12/2008 | Tamura | 345/169 |
| 2005/0078817 A1 | 4/2005 | Lee | |
| 2005/0107137 A1 | 5/2005 | Byun et al. | |
| 2006/0056141 A1 | 3/2006 | Pihlaja et al. | |
| 2006/0135229 A1 | 6/2006 | Kwak et al. | |
| 2007/0123322 A1 | 5/2007 | Mizushina | |
| 2007/0153465 A1 | 7/2007 | Shih et al. | |
| 2007/0254730 A1 | 11/2007 | Kim et al. | |
| 2007/0287512 A1 | 12/2007 | Kilpi et al. | |
| 2007/0293286 A1 | 12/2007 | Park et al. | |
| 2008/0039155 A1 | 2/2008 | Kim | |
| 2008/0064448 A1 | 3/2008 | Huang | |
| 2008/0207272 A1 | 8/2008 | Thornton et al. | |

(Continued)

FOREIGN PATENT DOCUMENTS

EP 1583331 A1 10/2005

(Continued)

OTHER PUBLICATIONS

International Search Report and Written Opinion for PCT/2010/028183, Filed on Mar. 22, 2010, Applicant: T-Mobile USA, Inc., Date of Mailing: Oct. 15, 2010, 9 pages.
"MOTOROKR™ E8 User Guide," Motorola, Inc., 106 pages.

(Continued)

*Primary Examiner* — Kamran Afshar
*Assistant Examiner* — Sayed T Zewari
(74) *Attorney, Agent, or Firm* — Perkins Coie LLP

(57) ABSTRACT

A secondary display system on a mobile device to allow a user to check the status of mobile device services without having to turn on or otherwise rely upon the primary display of the mobile device. The secondary display presents a count of messages that are waiting to be accessed by the mobile device user. When a new message is received for the user, a summary of the message is displayed to the mobile device user. When a user accesses one of the waiting messages, the count of unopened messages is decremented. The secondary display system may perform queue management to ensure that only counts of recently received messages are displayed. The secondary display system may offer different status modes to highlight the status of different mobile device services or states. The secondary display system may also allow a user to respond to a received message in a limited manner.

32 Claims, 9 Drawing Sheets

U.S. PATENT DOCUMENTS

| | | | |
|---|---|---|---|
| 2008/0232070 | A1 | 9/2008 | Kuwajima et al. |
| 2008/0287169 | A1 | 11/2008 | Kim et al. |
| 2008/0304218 | A1 | 12/2008 | Park et al. |
| 2009/0005135 | A1 | 1/2009 | Lindgren et al. |
| 2010/0159995 | A1* | 6/2010 | Stallings et al. ............. 455/566 |
| 2010/0240417 | A1 | 9/2010 | Wickman et al. |
| 2010/0240425 | A1 | 9/2010 | Madsen et al. |

FOREIGN PATENT DOCUMENTS

| | | |
|---|---|---|
| EP | 1887761 A2 | 2/2008 |
| KR | 20050035455 A | 4/2005 |
| WO | WO-2009009154 A1 | 1/2009 |

OTHER PUBLICATIONS

"Motorola ROKR E8 and its Morphing Keypad (video)," YouTube, Jan. 7, 2008, http://www.youtube.com/watch?v=e4RWL2xD0UU&feature=channel [Accessed Jul. 19, 2010], 2 pages.

Malykhina, Elena, "Mode Shift Helps Motorola Rokr E8 Stand Out," InformationWeek, Jan. 16, 2008, http://www.informationweek.com/news/mobility/business/showArticle.jhtml?articleID=205801037 [Accessed Jul. 19, 2010], 2 pages.

Spindel, Jacob, "Motorola RAXR2 V9m," Mobile Tech Review, Nov. 14, 2007, http://www.mobiletechreview.com/phones/Motorola-RAZR2-V9m.htm [Accessed Jul. 19, 2010], 5 pages.

Zhang, Tong, "LG Chocolate 3," Mobile Tech Review, Aug. 11, 2008, http://www.mobiletechreview.com/phones/LG-Chocolate-3.htm [Accessed Jul. 19, 2010], 5 pages.

International Search Report and Written Opinion for PCT/2010/028186, Filed on Mar. 22, 2010, Applicant: T-Mobile USA, Inc., Date of Mailing: Nov. 4, 2010, 8 pages.

* cited by examiner

SECONDARY STATUS DISPLAY FOR MOBILE DEVICE

CROSS-REFERENCE TO RELATED APPLICATION(S)

This application is related to concurrently filed U.S. patent application Ser. No. 12/409,469, entitled "MULTIFUNCTION MOBILE DEVICE HAVING A MOVABLE ELEMENT, SUCH AS A DISPLAY, AND ASSOCIATED FUNCTIONS".

BACKGROUND

Users of mobile devices, such as cell phones, smart phones, personal digital assistants, portable media players, and portable gaming devices, have an increasing number of options to communicate with other users. For example, users may communicate with other users via email, instant messaging, SMS and MMS messaging, and via voice and/or video. Moreover, users increasingly have a number of social networking services that they may use to communicate with other users, such as by sending messages to other users via Facebook, mySpace, Orkut, and Twitter. The vast number of channels that users now have to communicate with other users has greatly expanded the use and enjoyment of mobile devices to stay in touch with friends, families, and colleagues.

While the proliferation of communication channels has provided great benefits to mobile device users, the number of channels has come at a price. Users are now inundated with messages from other users. For example, a user may receive voicemails from families, emails from work colleagues, instant messaging requests from friends, pokes on their Facebook profile, and the like. Learning of and accessing each of these messages requires a user to utilize different applications or different capabilities on their mobile device. For example, the user may be required to call a voicemail system in order to determine the number and identity of voicemails that were left for the user, use a browser application to log-on to a Facebook profile and see what messages are waiting to be read, and access an SMS or MMS messaging application to see what messages are waiting for review. Accessing other communication channels may involve even more onerous steps. Checking the status of each of these communication channels can be time consuming and extremely frustrating to users. The need therefore exists for a system that overcomes these problems, progresses the state of the art, and provides additional benefits.

DETAILED DESCRIPTION

Figure 1A:
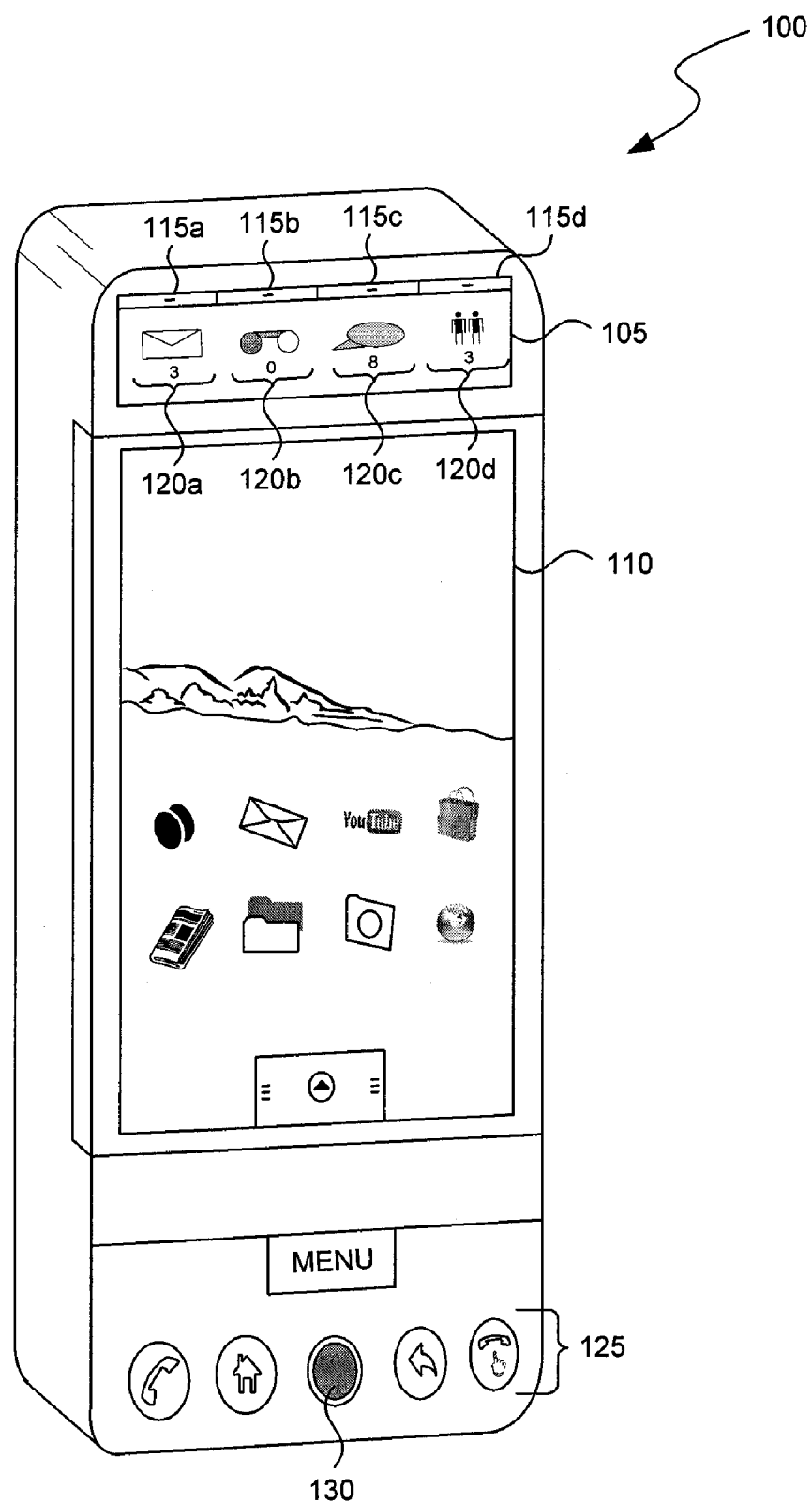
FIG. 1A is a perspective view of a mobile device with a secondary display on a mobile device surface that is generally coplanar with a primary display.

A secondary display system on a mobile device to allow a device user to check the status of mobile device services or states without having to turn on or otherwise rely upon the primary display of the mobile device is disclosed herein. In some embodiments, the secondary display is used to present a count of messages that are waiting to be accessed by the mobile device user. Messages for which counts are presented to a user may include email messages, voicemail messages, SMS messages, MMS messages, social networking messages, and other messages. The secondary display provides a count of each type of message that is queued and waiting to be accessed by the user. When a new message is received for the user, a summary of the message is displayed to the mobile device user. The message summary may include the contents of a regarding (i.e., "re:") line, the first line of the message, an indication of the sender that left the message, a time the message was received, and other similar information. When a user accesses one of the waiting messages, the count of unopened messages that is displayed to the user is decremented. By displaying message summaries to a user as well as a count of messages waiting for the user, the user is able to quickly determine whether a message or queue of messages warrants the user taking time to check the message using the primary display of the mobile device.

In some embodiments, the secondary display system performs queue management to ensure that the secondary display only displays counts of recently received messages. Old messages that have not been opened for a threshold period of time may be removed from the count so that the count only reflects those messages that were recently received.

In some embodiments, the secondary display system offers different status modes to the user to highlight the status of different mobile device services or states. For example, in addition to the previously mentioned messaging status mode, the secondary display may also operate in a social networking status mode to reflect a status of changes to a user's social networks, in a location status mode to reflect people or places that are in proximity to the user, in a signal mode to display the status of the mobile device battery and current signal strength, and in a clock mode to allow the user to view the time and to set an alarm. Other modes may of course be added that are tied to particular device services or features that are beneficial to the user.

In some embodiments, the secondary display system may allow a user to respond to a received message in a limited and pre-defined manner. For example, in response to seeing the arrival of a message from a friend, the user may be allowed to respond "yes," "no," or "I'll call you soon." By enabling the user to quickly respond to an incoming message using a limited response set, the secondary display facilitates the user's management of incoming communications.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

FIG. 1A is a perspective view of a mobile device 100 with a secondary display 105 contained on a mobile device surface that is generally coplanar with, or in an offset, but parallel plane to, a primary display 110. Mobile device 100 may be any device having wireless communication capability, such as a cell phone, smart phone, personal digital assistant, portable media player, Internet browsing device, portable gaming device, etc. In some embodiments, the secondary display 105 is a rectangular display that stretches the width of the mobile device. The display may be a liquid crystal display (LCD), an organic light emitting diode (OLED) display, an E-Ink display, or other display that may be kept on for an extended period even when operating on a mobile device with a limited power source. In some embodiments, the display has a height/width dimension ratio of 1:8 (e.g., a height of 4.5 mm and a length of 36 mm). Such a display size allows a 128 pixel by 16 pixel resolution, suitable for the display of text and simple graphics. A higher resolution may also be achieved in the same space depending on the type and quality of the display that is utilized in the device. While an elongated secondary display 105 is depicted in FIG. 1A, it will be appreciated that the secondary display may take any form, such as a square, rectangle (with a different height/width ratio), oval, etc. The shape and size of the display may be varied depending on the form factor of the mobile device and the desired status information that is to be displayed to the mobile device user.

The secondary display system includes two or more controls that are used to interact with the display 105 and information depicted on the display. For example, the depicted mobile device 100 contains four buttons 115a-d that enable a user to select device features, display modes, or otherwise interact with information that is presented on the display. The buttons may be back-lit or contain other illumination to allow a user to easily identify the buttons in low-light conditions. The buttons are located adjacent to the secondary display 105, such that each button corresponds to a different region of the secondary display. That is, button 115a is adjacent a region 120a of the secondary display, button 115b is adjacent a region 120b, button 115c is adjacent a region 120c, and button 115d is adjacent a region 120d. By placing the buttons adjacent to the display, the buttons may be used to cause the mobile device to implement a function or enter a mode that is reflected by an icon, graphic, word, or characters that is displayed in the corresponding region adjacent each button. For example, the selection of button 115b may cause the mobile device to implement a function or enter a mode that is displayed to the user in region 120b. As another example, the selection of button 115d may cause the mobile device to implement a function or enter a mode that is displayed to the user in region 120d. As will be described in additional detail herein, the implemented functions or entered modes may be varied depending on the current mode of the mobile device. While four buttons 115a-d are depicted in FIG. 1A, it will be appreciated that a greater or lesser number of buttons may be added to the mobile device, and that the buttons may be placed above, below, and/or to either side of the display.

The primary display 110 is larger than the secondary display and is the primary visual interface used by the user when utilizing the mobile device. The primary display may be a liquid crystal display (LCD), an organic light emitting diode (OLED) display, an E-ink display, or other display suitable for a mobile device operating on battery power. In some embodiments, the primary display 110 may be movable with respect to the secondary display. A moveable primary display is provided in assignee's concurrently filed U.S. patent application Ser. No. 12/409,433 entitled, "MOBILE DEVICE HAVING A MOVABLE DISPLAY AND ASSOCIATED SYSTEMS AND METHODS" and further described in concurrently filed U.S. patent application Ser. No. 12/409,469, entitled "MULTIFUNCTION MOBILE DEVICE HAVING A MOVABLE ELEMENT, SUCH AS A DISPLAY, AND ASSOCIATED FUNCTIONS", which are both hereby incorporated by reference in their entirety. Both the primary display and the secondary display may be touchscreens to facilitate user interaction with the device. When the secondary display is implemented as a touchscreen, the buttons 115a-d may be omitted and the function of the buttons implemented using the touchscreen instead.

In addition to the buttons associated with the secondary display, the mobile device 100 typically includes one or more other controls that are associated with device operation. Such controls may include buttons 125 that are associated with commonly-used device features, a miniature trackball 130 that is used to navigate menus or manipulate a cursor that is displayed on the primary display, a QWERTY or reduced-key keyboard (not shown), and other input components.

Figure 1B:
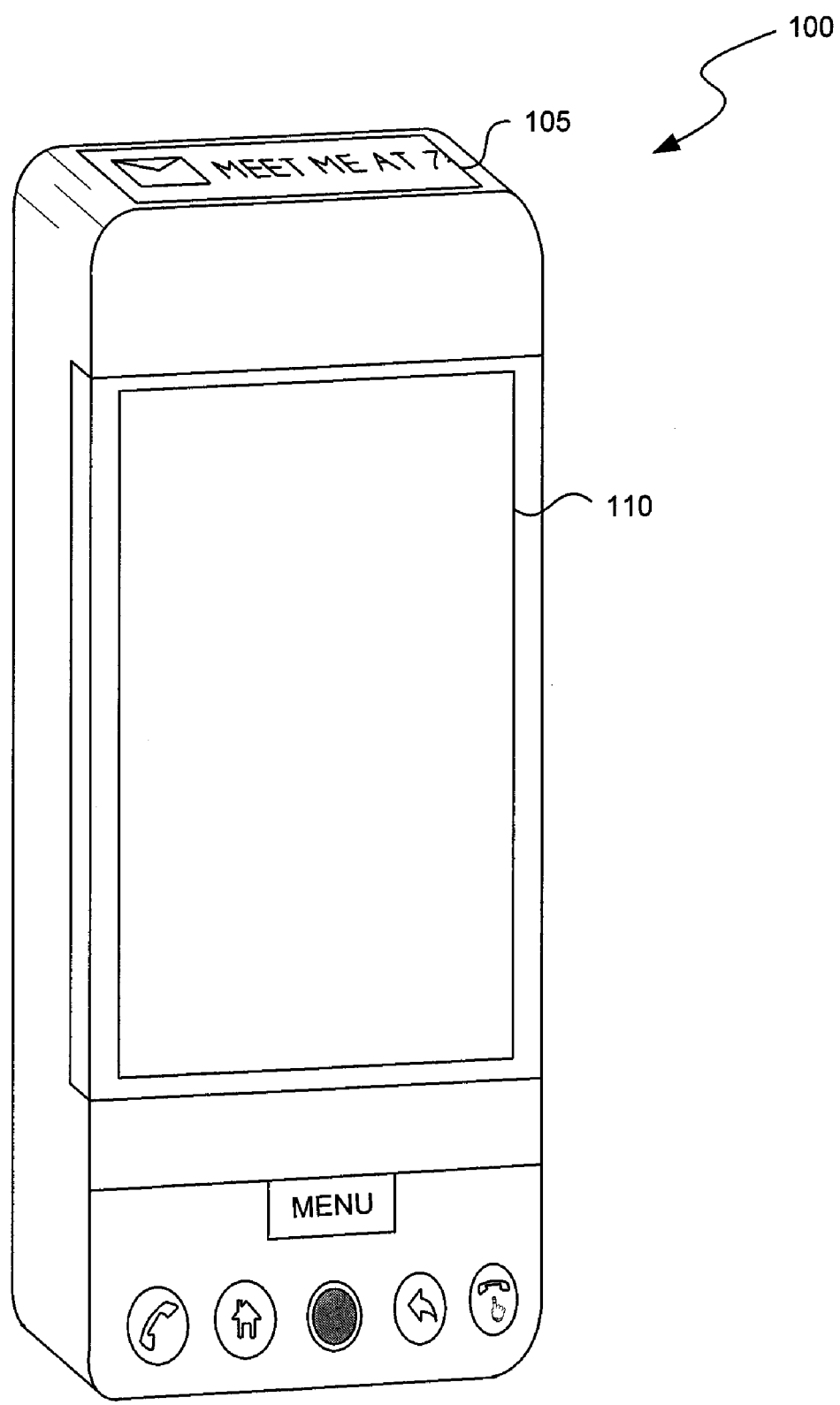
FIG. 1B is a perspective view of a mobile device with a touchscreen secondary display on a mobile device surface that is not coplanar with a primary display.

FIG. 1B is a perspective view of a mobile device 100 with the secondary display 105 contained on a mobile device surface that is not coplanar with the primary display 110. In the example depicted in FIG. 1B, the secondary display has been placed on the top edge of the mobile device, at a location where it is generally perpendicular to the orientation of the primary display. When viewed face-on, a user of the secondary display would therefore be unable to simultaneously view the primary display. Rather than buttons 115a-d being located adjacent to the secondary display, in the example depicted in FIG. 1B the secondary display is a touchscreen. When the secondary display is implemented as a touchscreen, the surface of the secondary display may be mapped to create one or more buttons. For example, a first region on the touchscreen may be mapped to operate as a first button, a second region on the touchscreen may be mapped to operate as a second button, etc. Such mapped regions on the touchscreen may then operate as the previously described buttons 115a-d to allow a user to select information displayed on the secondary display or otherwise interact with the secondary display. Moreover, when a touchscreen is used for the secondary display, the system may allow a user to use certain gestures to navigate or otherwise interact with the displayed information. For example, a user may slide a finger across the secondary display to cause the display to scroll from left-to-right or right-to-left. As another example, the user may use a pinching or spreading motion with two fingers to select or expand menu items. An advantage of locating the secondary display on the top or other edge of a mobile device is that it allows a user to quickly check messaging status or other status without having to remove the device from a pocket, purse, belt clip, or other carrying location. It will be appreciated that the secondary display, however, may be oriented at any angle to the primary display and need not be coplanar or perpendicular with the primary display.

The primary display 110 may be powered on at the same time as the secondary display 105, or the primary and secondary displays may be operated in a manner where only one display is powered on at a time. One advantage of a secondary display in a mobile device is that a user can check status and receive instant or approximately instant notification of incoming messages via the secondary display 105 without having to power on the primary display 110. Keeping the primary display 110 off can significantly reduce the power consumption of the mobile device 100 and, accordingly, increase the battery life of the device. Moreover, the user can still receive a constant stream of timely information via the secondary display 105.

Although the mobile device depicted in FIG. 1A depicts a particular configuration of mobile device, the secondary display disclosed herein may be used in any mobile device configuration. For example, the secondary display may be used in a mobile device having a clamshell configuration, a configuration wherein one portion of the mobile device pivots, slides, or expands with respect to another portion of the mobile device, a configuration where the primary display encompasses most of one side of a mobile device, etc.

Figure 2:
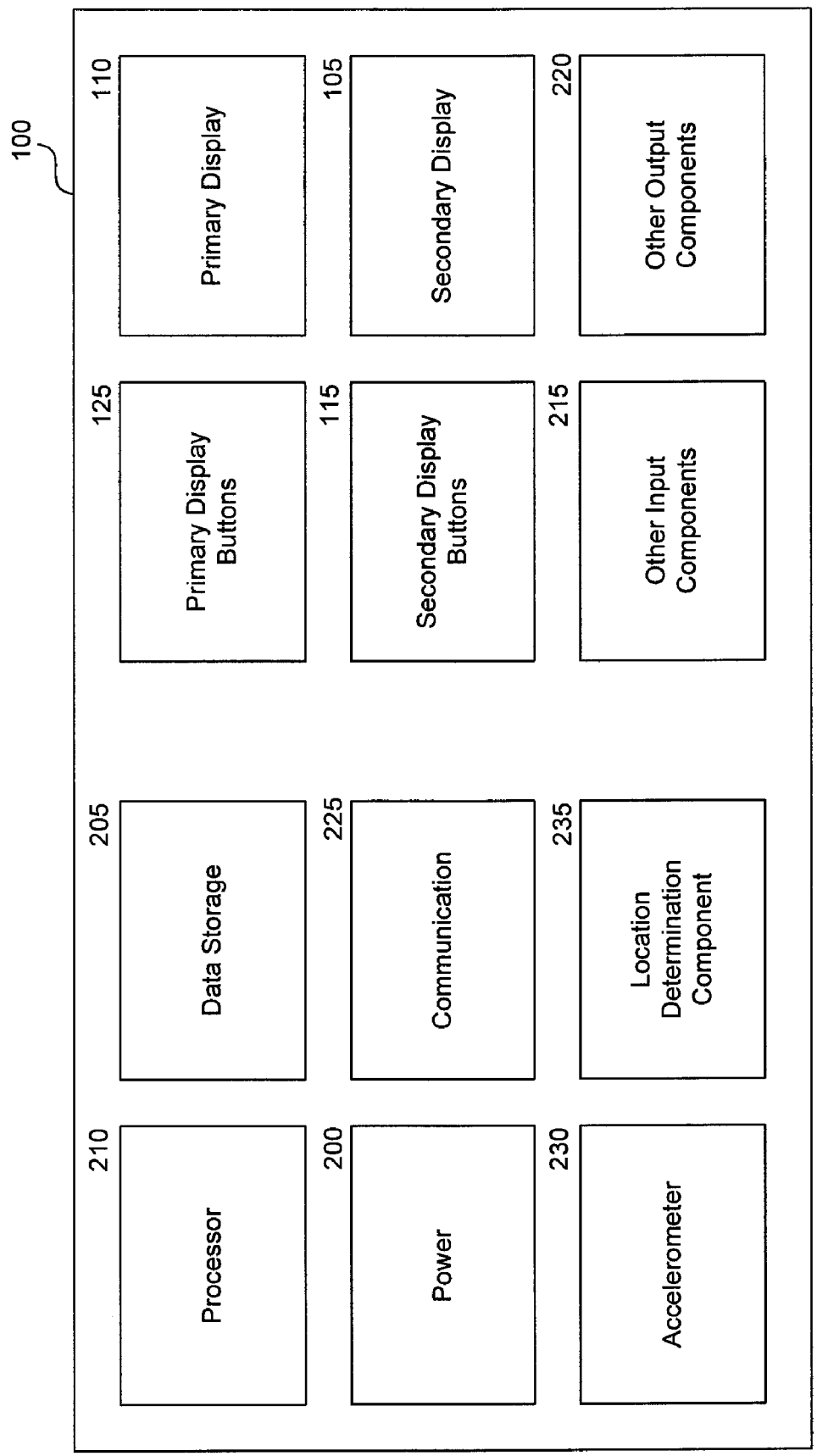
FIG. 2 is a block diagram of components within a mobile device that, among other functions, control a secondary display.

FIG. 2 is a block diagram of representative components within a mobile device 100 having a primary display 105 and a secondary display 110. The mobile device contains a power subsystem 200, a data storage area 205 to store applications and data, and one or more processors 210 to run an operating system and a variety of applications, including applications to implement the functionality disclosed herein. Processors 210 include programmable general-purpose or special-purpose microprocessors, programmable controllers, application specific integrated circuits (ASICs), programmable logic devices (PLDs), or the like, or a combination of such devices. The data storage area 205 may be memory, such as random access memory (RAM), read-only memory (ROM), flash memory, or the like, or a combination of such memory. Data storage area 205 may also include one or more storage devices, such as magnetic or optical based disks, flash memory devices, or any other type of non-volatile storage medium for storing data. Applications may include one or more program modules which include routines, programs, objects, components, data structures, and so on that perform particular tasks or implement particular abstract data types. The functionality of the program modules may be combined or distributed across multiple computing systems or devices as desired in various embodiments.

Users may interact with the mobile device 100 in a number of ways. Primary display buttons 125 allow the user to initiate common device features. Secondary display buttons 115 allow the user to change display modes and interact with information that is displayed on the secondary display. Other input components 215 may be included in the mobile device, such as a QWERTY keypad, a reduced keypad (e.g., a numeric keypad), a touchscreen, a track ball or track pad, a voice recognition system, or the like, to allow a user to enter data or commands into the mobile device. Other output components 220 may also be provided in the mobile device, such as a speaker, headphone jack, status lights, vibration component, or the like, to allow information to be conveyed to the user. The mobile device 100 may also include an accelerometer 230 to determine an orientation and to detect small-scale motion of the device and a location determination component (e.g. a GPS component) 235 that is used to determine a physical location and to detect large-scale motion of the device.

To establish a communication channel with other devices or services, the mobile device may include one or more other communication components 225, such as components that enable the mobile device to communication with other devices or networks via short range communication protocols (e.g., Bluetooth, Wi-Fi, Ultra-wideband, and ZigBee) and radio-access network protocols (e.g., GSM (Global System for Mobile Communications), CDMA (Code Division Multiple Access), UMTS (Universal Mobile Telecommunications System), EDGE (Enhanced Data for GSM Evolution), LTE (Long Term Evolution), WiMax (Worldwide Interoperability for Microwave Access), UMA/GAN (Unlicensed Mobile Access/Generic Access Network)). The mobile device may also include communication ports (e.g., USB port, etc.) for connecting the mobile device 100 to an external device (e.g., a personal computer) using a wired connection. One skilled in the art will appreciate that the mobile device 100 may also include various other computing components that are not expressly identified in the figure.

Figure 3A:
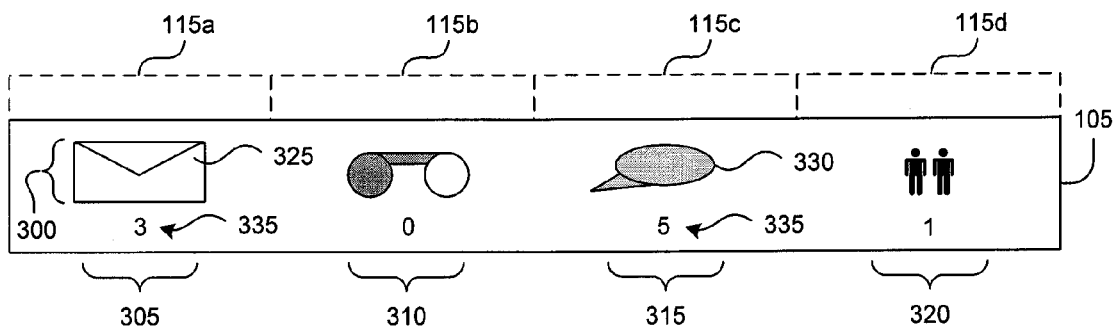
FIGS. 3A-3F are screen shots that depict the use of a secondary display to show queue counts and message summaries.
Figure 3B:
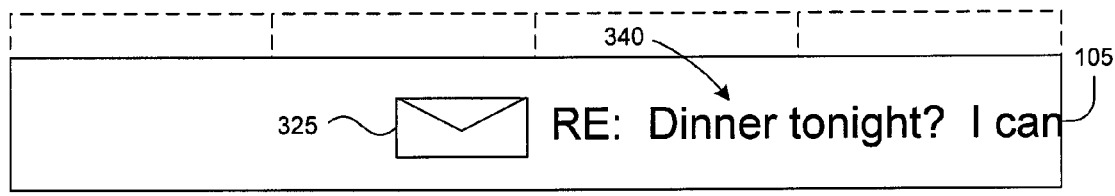

FIGS. 3A-3F are screen shots that depict the use of the secondary display 105 to show queue counts and message summaries. FIG. 3A is a screen shot associated with a messaging status mode 300 of the secondary display 105. In the messaging status mode 300, the secondary display presents a count of the number of messages contained in queues that are waiting to be accessed by a user. Messages may be email messages, voicemail messages, instant message (IM) messages, SMS or MMS messages, social networking messages (e.g., tweets, pokes), or the like. In the depicted example, the status of four queues is displayed, namely the status of an email queue 305, a voicemail queue 310, a text message queue 315, and a preferred social networking queue 320. Each queue is represented by an icon, such as an envelope icon 325 to represent the email queue and a "thought bubble" icon 330 to represent the text message queue. The status of each queue is indicated by a count 335 which represents the number of messages in the queue that have not yet been accessed (i.e., are currently unopened) by the user. For example, the email queue count indicates that three email messages have not been accessed by the user and the text message queue count indicates that five unread entries are contained in a current instant message thread. A queue count of zero indicates that no messages are currently in the queue for the user.

It a mobile device user would like to access the messages in a queue, the user may quickly and easily do so by pressing and holding a corresponding button 115a-115d that is associated with the queue. Selecting and holding a corresponding button causes the mobile device to connect with the application or service associated with the queue. Such connection may be made visually, such as via the primary display, or in an auditory fashion, such as over a speaker in the mobile device. For example, the selection of button 115b associated with the voicemail queue 310 causes the mobile device to connect with a voicemail service and allow the user to listen to un-accessed or previously-accessed voicemails. As another example, the selection of button 115d associated with the social networking queue 320 causes the mobile device to access and display on the primary display a preferred social networking service (e.g., MySpace, LinkedIn, Facebook, Orkut). When connecting with an application or service, the mobile device may provide identification information or other log-on information (e.g., a password) to facilitate the connection process. Services may be accessed via a browsing application on the mobile device (e.g., a WAP browser), or via a dedicated application that is contained on the mobile device and that is associated with accessed service. The messaging status mode 300 of the secondary display 105 therefore allow a mobile device user to quickly assess the number of messages waiting for the user and determine which, if any, application or service that the user would like to access in order to retrieve the waiting messages. The messaging status mode presents limited information to the user, which allows the user to determine whether a longer interaction via the traditional accessing method (i.e., primary display or voice channel) is warranted.

Figure 3C:
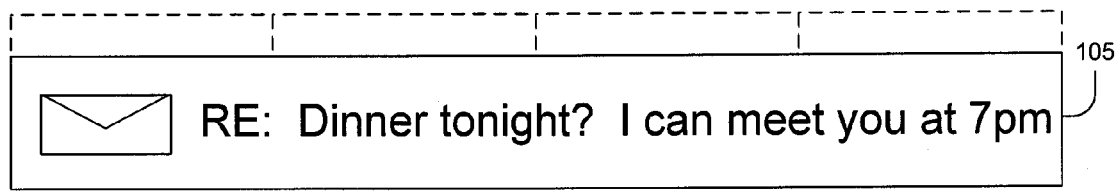
Figure 3D:
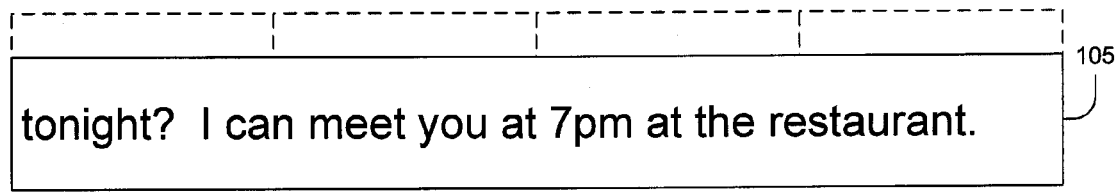
Figure 3E:
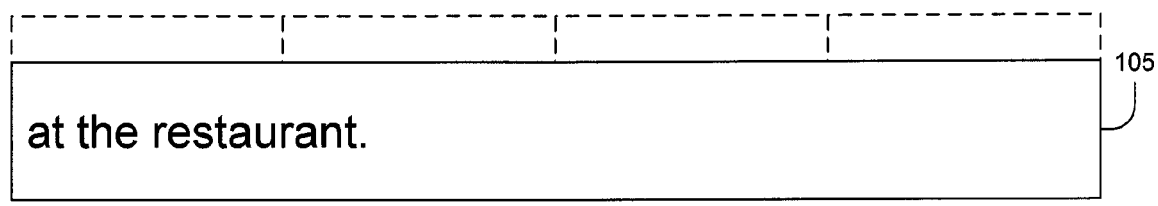

When a new message or an indication of a new message is received by the mobile device, the secondary display system presents a summary of the new message to the mobile device user and increments the queue count associated with the message. FIGS. 3B-3E are screen shots that depict the presentation of a message summary to the user. For messages that are textual in nature (e.g., emails, IMs, SMS, etc.), a displayed summary may include the contents of a regarding (i.e., "re:") line, the first line of the message, an indication of the sender that sent the message, a time the message was received, keywords that are contained in the message, and other similar information. For audio messages, a displayed summary may include an indication of the sender that left the message, a time that the message was received, a portion of a speech-to-text transcription of the message, and other similar information. To enhance the visual impact on a user, in some embodiments the message summary is scrolled across the secondary display. FIGS. 3B-3E depict such scrolling. In the example depicted in FIG. 3B, a new email message has been received by the mobile device. The secondary display system has exited the messaging status mode and entered a message summary mode, wherein the system causes a message summary to start to scroll across the secondary display. In the depicted example, the scrolling progresses from the right side of the display to the left side of the display. To indicate that the received message was an email, an email icon 325 precedes the summary text. The email icon is followed by selected summary text 340, which in the depicted example is the "RE:" line from the email message. The message summary (i.e., the icon and the text) scrolls across the display, and as depicted in FIGS. 3C-3E, progressively scrolls off of the left side of the display. In order to maximize the likelihood that the user will see the message summary, each message summary may scroll two or more times across the secondary display. While scrolling may be used to call a user's attention to the summary, it will be appreciated that other mechanisms could be used to highlight a message summary, such as flashing the summary on the display, displaying the summary in a different color, displaying the summary in conjunction with a tone or other sound, causing the summery to face into or out of view, etc. In addition, colors and tones may be used by the system to distinguish messages that are received from one sender or class of sender over messages received from other senders. For example, messages from certain friends may be displayed by the system in a different color or presented in conjunction with a certain tone that is different than the color or tone that is used by the system to present messages from other friends.

If a user presses a button or otherwise selects a message summary as it is being presented to the user, the system may implement various functions related to the displayed message summary. For example, the system may present additional summary information about the message to the user, such as the sender name, date, or time, if only the regarding line from the message had initially been displayed in the message summary. As another example, the secondary display system may allow a user to respond to the received message in a limited and pre-defined manner as will be described in greater detail with respect to FIGS. 6A-6C.

Figure 3F:
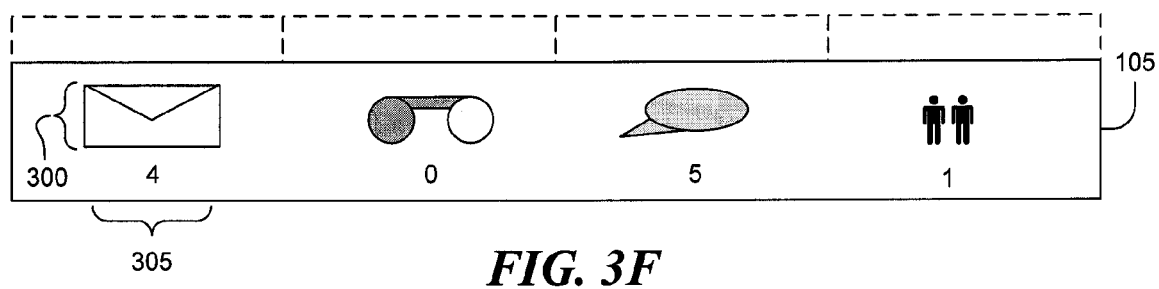

After the message summary has been displayed to a user, the secondary display system updates the appropriate message queue count to reflect that an additional message is waiting to be accessed by the user. FIG. 3F depicts the secondary display 105 when it returns to the messaging status mode 300. As a result of the email that is received by the mobile device, the email queue 305 has been modified to reflect the newly-received message. In the depicted example, the email queue count has been incremented from three to four messages. Various graphical techniques may be utilized to show incrementing the queue count. For example, an animation may show the envelope icon 325 from the message summary being overlaid onto the envelope icon of the email queue. Those skilled in the art will appreciate that other animations may be utilized to enhance the user's understanding of the messaging status mode operation.

It a mobile device user would like to review the summaries of messages in a queue, the user may quickly and easily do so by pressing the corresponding button 115a-115d that is associated with a queue for a short period of time. Selecting a button for a short period of time causes the mobile device to sequentially re-display on the secondary display each message summary that is associated with a message in the queue. The system may also allow a user to manually step through each message summary associated with a message in the queue, such as by pressing the corresponding button once for each message summary. A user may therefore quickly review the summarized contents of a queue to determine if any of the messages require immediate attention.

Figure 4A:
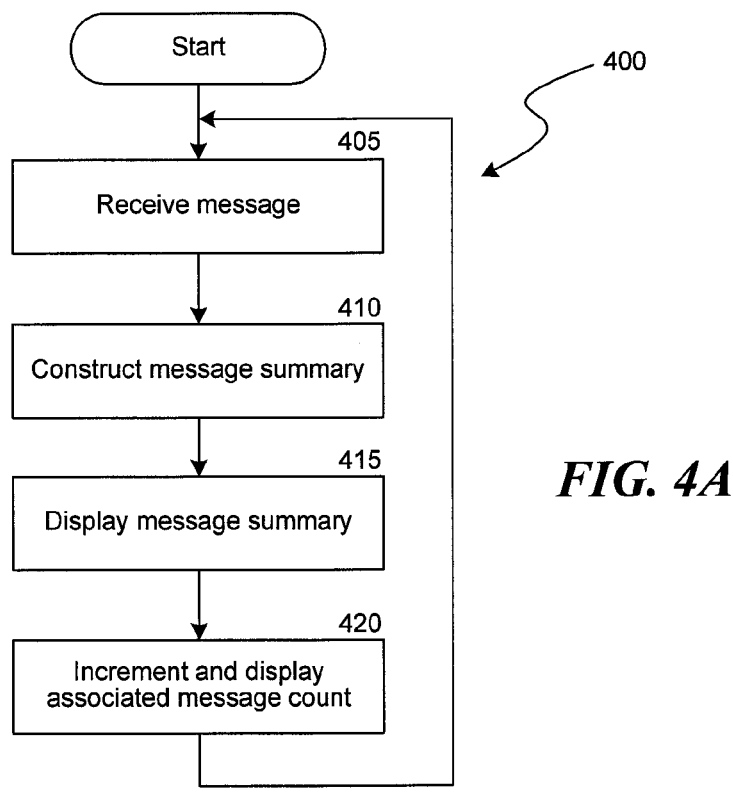
FIGS. 4A-4B are flow charts of control processes to display message summaries, update queue counts, and manage queue counts.

FIG. 4A is a flow chart of a control process 400 that is implemented by the secondary display system to display message summaries and update queue counts. At a block 405, the secondary display system receives an indication that a message is available for access by a user. The message may be delivered to the mobile device (e.g., the mobile device receives an email) or an indication may be delivered to the mobile device that the message is available for access via a remote service (e.g., the mobile device receives an indication that a voicemail message is available for pick-up at a voicemail service). Such an indication may be provided from external services via application programming interfaces (APIs) that are provided by the external services, or via an application on the mobile device that periodically checks the services to determine whether additional messages have been received since the previous check. At a block 410, the system constructs a summary of the message. As previously described, for messages that are textual in nature (e.g., emails, IMs, SMS, etc.), a displayed summary may include the contents of a regarding (i.e., "re:") line, the first line of the message, an indication of the sender that sent the message, a time the message was received, keywords that are contained in the message, and other similar information. For audio messages, a displayed summary may include an indication of the sender that left the message, a time that the message was received, a portion of a speech-to-text transcription of the message, and other similar information. In some embodiments, the message summary may be constructed by a remove service and delivered to the mobile device along with the message or the indication of the message.

Once the message summary has been constructed, at a block 415 the system displays the message summary on the secondary display. The message summary may be scrolled, flashed, statically displayed, faded in or out, etc. At a block 420 the system increments the count of the message queue that is associated with the message and displays the updated count in the messaging status mode screen. In some embodiments, the system may increment and display the updated count for the message queue in the messaging status mode screen without first displaying a message summary to a user.

Figure 4B:
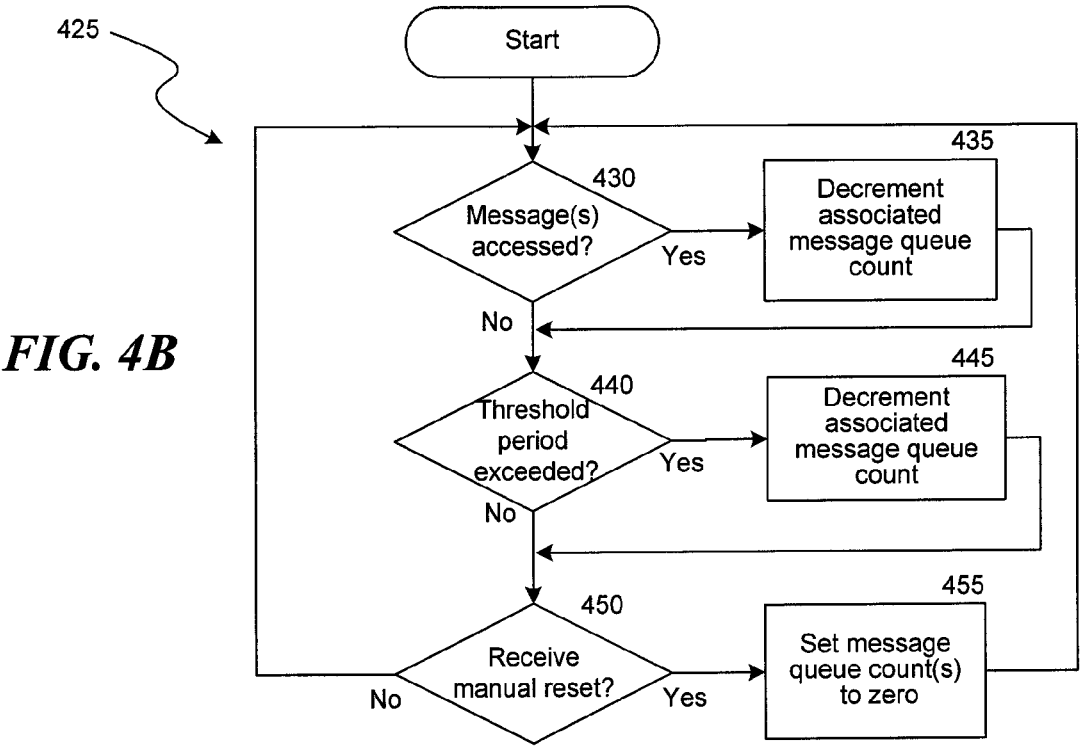

FIG. 4B is a flow chart of a control process 425 that is implemented by the system to manage a message queue count. The control process may be periodically or continuously run by the system to maintain an accurate and meaningful queue count for a user. At a decision block 430, the system determines whether the user has accessed one or more of the messages in a message queue. If one or more message were accessed by the user, at a block 435 the system appropriately decrements the associated message queue count. Messages that were accessed by the user should be removed from the count, since the message queue count is intended to reflect only those messages that a user has not yet accessed. After decrementing the message queue count, processing continues to a decision block 440. Similarly, if no messages were accessed by the user at decision block 430, processing continues to a decision block 440.

At decision block 440, the system determines whether a threshold period has been exceeded by any of the messages in a message queue. Each message queue may have a different threshold period that reflects a length of time that a message should remain represented in the queue count before the age of the message indicates that the message is likely stale. For example, because instant messaging sessions are so transitory, a user may only be interested in seeing the number of new IM messages that have been received within the past hour represented in the IM queue count. In contrast, because voicemails are typically important to a user, the number of voicemails contained in the voicemail queue may be important to the user regardless of the length of time that a voicemail has remained in the queue. The user would therefore expect to see all voicemails that haven't yet been accessed accounted for in the voicemail queue count. At decision block 440, the age of each message that is represented in the queue count is compared against the associated threshold period. If the age of one or more messages is older than the threshold period, processing continues to block 445 where the message queue count is appropriately decremented. When the age of a message indicates that it is older than the threshold period, it is unlikely that a user would be immediately interested in accessing the message and the need to show the message to the user in the corresponding queue count is therefore reduced. Note that decrementing the queue count only impacts the messaging status information that is presented to the user. The corresponding message is still contained in the queue and may be accessed by the user via the appropriate application or service interface. After decrementing the queue count, processing continues to a decision block 450. Similarly, if none of the messages represented in a queue count have exceeded the corresponding threshold period at decision block 440, processing continues to a decision block 450.

At decision block 450, the system determines whether an indication has been received from the user to reset the queue count. In some embodiments, the system may allow the user to manually reset the queue count to zero for one or more queues. By resetting the queue count, the user is able to control the time period over which received messages are monitored. If a command to manually reset a queue count has been received by the system, at a block 455 the system sets the corresponding queue count to zero. If a command to manually reset a queue count has not been received by the system, processing returns to decision block 430 to continue to monitor access to the message queue by the user. Process 425 may be performed by the system for all message queue counts that are being managed and updated by the system.

Figure 5A:
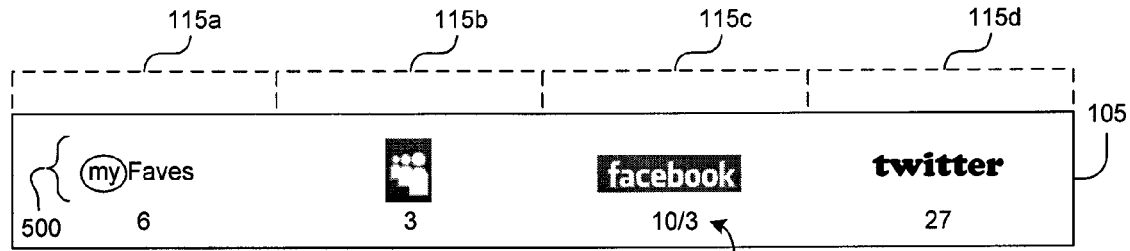
FIGS. 5A-5D are screen shots of various status modes that may be displayed on the secondary display.

In some embodiments, the secondary display system may offer different status modes to the user to highlight the status of different mobile device services or states. FIGS. 5A-5D are screen shots of various status modes that the secondary display system may present on the secondary display. FIG. 5A depicts a social networking status mode 500 having status summaries of various social networks to which a user belongs. Icons representing four social networks are depicted (MyFaves by T-Mobile, mySpace, Facebook, Twitter), but additional or different social networks may be displayed. Each social network has an associated count of messages that are waiting to be accessed by the user at that social network. For example, six messages are awaiting access at myFaves and 27 tweets are awaiting access at Twitter. Social networking messages may include the presence of pokes, notifications, updates, tweets, and other messages such as are commonly available at social network services. In some embodiments, counts of different types of messages available from a single social network service may be presented to the user. For example, the Facebook queue includes a count 505 of "10/3", which indicates the presence of 10 wall posts and 3 pokes. Selecting a corresponding button causes the mobile device to connect with the social networking service associated with the queue and display the messaging interface of the social networking service on the primary display of the mobile device.

Figure 5B:
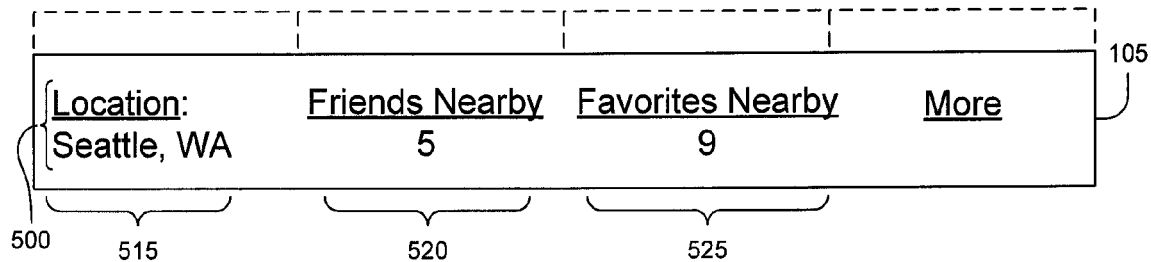

FIG. 5B depicts a location status mode 510 having status summaries that depend on the physical location of the mobile device. For example, the location status mode may depict a present location (e.g., city, state) 515 of the device. The location status mode may also indicate whether people or places of interest to the user are in close proximity to the mobile device. For example, the system may display a friend count 520 that indicates the number of friends that are in a certain proximity to the user (e.g., within 100 meters). The system may also display a favorites count 525 that indicates the proximity of certain businesses (e.g., coffee shops, book stores, areas of historical significance, etc.) or activities of interest to the user. Selecting one of the location status summaries may cause the system to present more detailed information about the friend or location on the secondary display, such as a list of the nearby friends and locations of interest. Selecting one of the location status summaries may also cause the system to launch an application on the primary display that presents more detailed location-based information to the user, such as a map with the nearby friends and locations highlighted on the map.

Figure 5C:
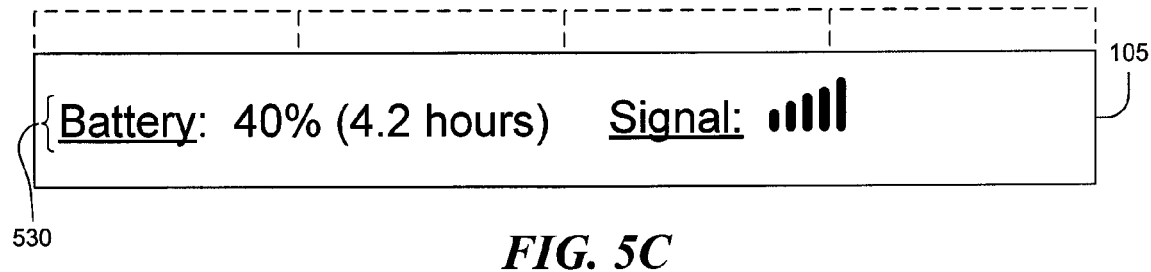
Figure 5D:
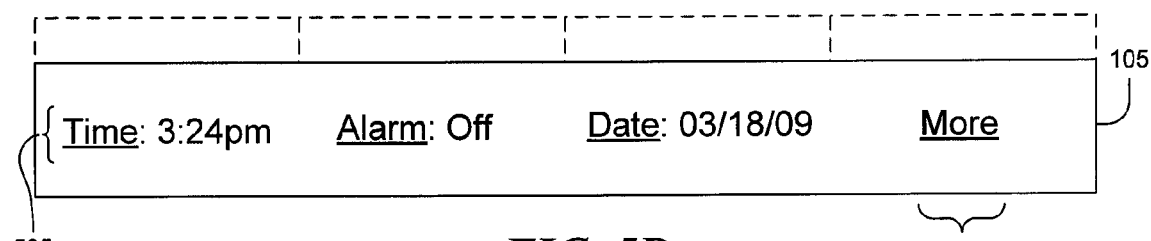

FIG. 5C depicts a signal mode 530 that displays the status of the mobile device battery and current signal strength. By selecting a corresponding button, the system may take a user to a mobile device control menu to allow the user to change the mobile device settings. FIG. 5D depicts a clock mode 535 to allow the user to view the current time, date, and to set an alarm on the mobile device. One menu option that is presented in the clock mode is a "more" option 540. Selecting the button associated with the "more" menu option causes the system to display additional menu information on the secondary display. Depending on how the menu is structured, the system may therefore allow the user to page through a number of screens of information related to the clock mode. Of course, a "more" menu option may be included in any status mode where it would be advantageous to offer the user additional menu choices in that mode.

While five status modes have been discussed herein, it will be appreciated that any additional status modes relevant to a mobile device user may also be presented on the secondary display. To switch between status modes, the system may allow key chording of buttons 115*a-d*. For example, the nearly simultaneous selection of buttons 115*a* and 115*b* may place the display into the social networking status mode, the nearly simultaneous selection of buttons 115*a* and 115*c* may place the display into a location status mode, etc. Alternatively, the repetitive pressing of a button combination (e.g., buttons 115*a* and 115*b*) may cause the display to sequentially cycle through the various status modes. When the secondary display is a touchscreen, the user may be able to switch between different status modes by scrolling horizontally. For example, a gesture to one side of the display or the other may cause the mobile device to switch to the next status mode. Other techniques may be utilized by the system to automatically predict which status mode should be displayed to a user depending on the state of the mobile device. For example, the system may have a default mode when the mobile device hasn't been accessed for an extended period of time or when the mobile device is utilized to make a telephone call.

Figure 6A:
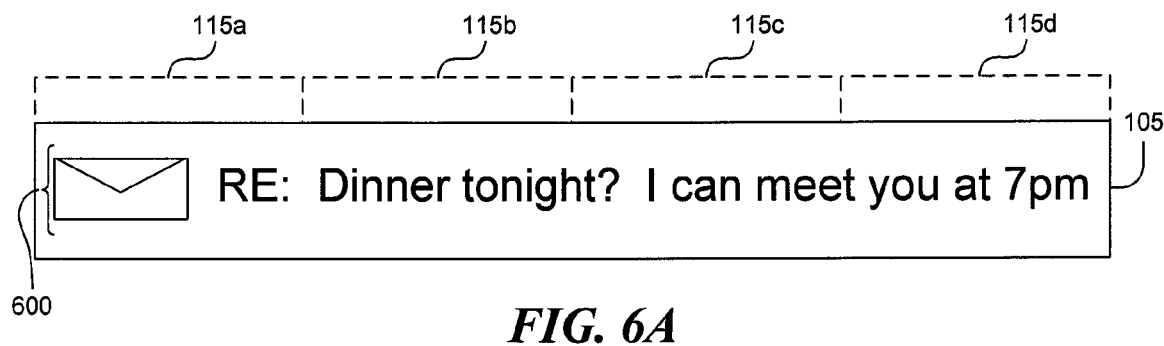
FIGS. 6A-6C are screen shots that depict the use of the secondary display to enable short responses to be sent by a user to a received message.
Figure 6B:
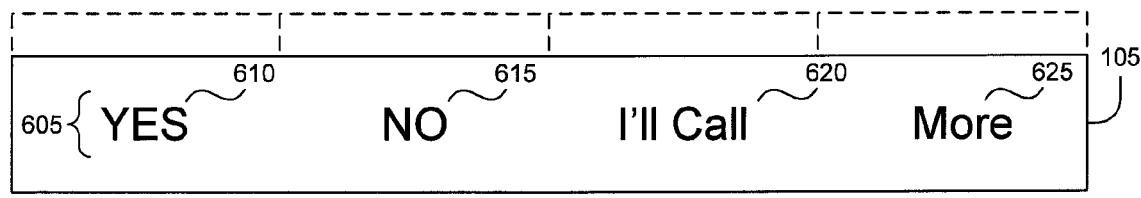
Figure 6C:
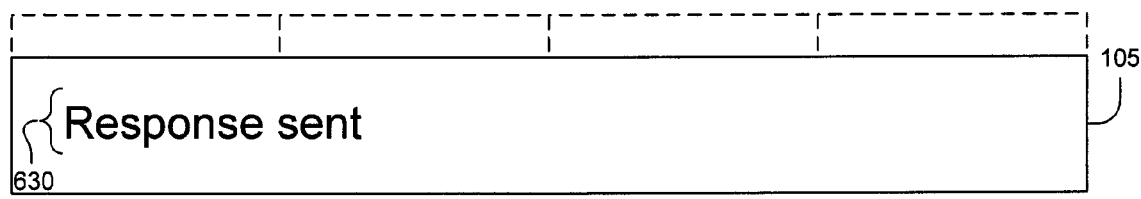

In some embodiments, the secondary display system may allow a user to respond to a received message in a limited and pre-defined manner. FIGS. 6A-6C are screen shots of an interface that is generated by the system and which allows the user to respond to a message using the secondary display 105 and buttons 115a-115d. FIG. 6A is a screen shot that depicts the presentation by the system of a message summary 600 to a user. In some circumstances, upon viewing a message summary the user might like to quickly reply to the message sender. To allow the user to do so, the system may offer the user a simple interface to generate a response. Such a response mode may be automatically entered, for example, by the user pressing any of the buttons 115a-115d when a summary message is scrolling across the secondary display. FIG. 6B is a screen shot a response interface 605 that is generated by the system and presented to the user. The response interface 605 contains three simple responses that may be sent in reply to a received message, namely a "Yes" response 610, a "No" response 615, and an "I'll Call" response 620. In addition, the system may provide a "More" menu option 625 to allow the user to see additional responses. The user may respond to the received message using a selected response by pressing the appropriate button 115a-d. When the system detects the selection of a button, the system automatically generates a message with the desired response and sends the response to the original message sender. Upon sending the response, the system may provide a confirming statement 630 on the secondary display to inform the user that a responsive action was taken.

Figure 7:
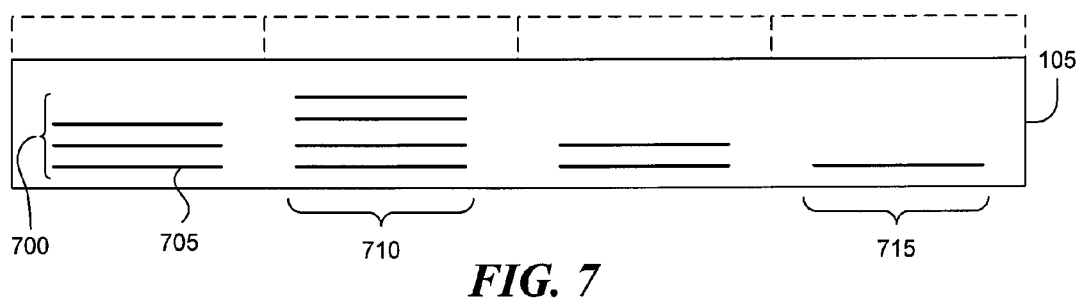
FIG. 7 is a screen shot of an alternate message queue count.

FIG. 7 is an alternative embodiment of a messaging status mode 700 in which the system presents a graphical display of the number of messages contained in queues that are waiting to be accessed by a user. Rather than display a number that is indicative of the number of messages that are contained in a queue, the system displays a bar, icon, or other element 705 that is indicative of the presence of a message that hasn't been accessed. The greater the number of displayed elements, the greater the number of messages that are contained in the queue. For example, the second queue 710 in FIG. 7 contains four times more messages than the fourth queue 715. Each element 705 displayed in the messaging status mode may reflect one message or more than one message (e.g., each element may reflect two messages, five messages, etc.). The messaging status mode of FIG. 7 therefore provides the user a quick graphical check of the number of messages in each queue. In addition to graphically displaying the size of the queue, the messaging status mode 700 shown in FIG. 7 also hides the identity of the underlying feature or service that is associated with each queue. The graphical messaging status mode 700 has no icon associated with each queue, so the burden is on the user to remember the identity of the service associated with the queue based on the position of the queue (e.g., the location of the queue with respect to buttons 115a-d). Some users may prefer to have the additional privacy that this mode offers, since a friend or colleague of the user would be unable to read and understand the information reflected by the secondary display unless they understood the underlying mapping of service to queue. In some embodiments, the system allows the user to specify the service-to-queue mappings of the graphical display.

It will be appreciated that the presence of the accelerometer 230 in the mobile device allows the interface presented by the system on the secondary display 105 to be modified depending on the orientation or motion of the mobile device. For example, the system may detect the orientation of the mobile device based on the signal from the accelerometer and flip the icons and counts that are displayed to a user so that the icons and counts are always displayed in a right-side up manner to the user. As another example, the system may detect when the mobile device has been physically shaken and may interpret the shaking as a command from the user to reset all displayed queue counts to zero. As still another example, the system may detect a tap of the mobile device on one side and interpret the tap to indicate that a user would like to switch the displayed status mode. In this manner, a user would be able to quickly cycle through all of the status modes on the secondary display by sequentially tapping the device.

The above detailed description of embodiments of the system is not intended to be exhaustive or to limit the system to the precise form disclosed above. For example, an API may be provided to the secondary display to allow third party developers to develop other applications that might use the secondary display other than as described herein. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples, and alternative implementations may employ differing values or ranges.

From the foregoing, it will be appreciated that specific embodiments of the invention have been described herein for purposes of illustration, but that various modifications may be made to the invention. Accordingly, the invention is not limited except as by the appended claims.

We claim:

1. A mobile device configured to interface with a plurality of messaging services, the mobile device comprising:
   a primary display;
   a secondary display,
      wherein the secondary display is smaller than the primary display, and
      wherein the secondary display is coplanar with or in an offset, but parallel plane, to the primary display;
   a communications component configured to communicate with a telecommunications network;
   user input and output components, including audio components configured to facilitate voice communications, and a keypad configured to facilitate text communications;
   a processor coupled to the communications component, the primary display, the secondary display, and the user input and output components; and a housing configured to at least partially enclose the processor, the communications component, the memory, the primary display, the secondary display, and the user input and output components, wherein the processor is programmed to:
interface with a plurality of messaging services that are accessible via the telecommunications network and determine a number of messages that have not been accessed by a user at each of the plurality of messaging services,
wherein the number of messages is greater than one;
for each of the plurality of messaging services, present on the secondary display an indication of the messaging service and the corresponding number of messages that have not been accessed by the user at the messaging service;
receive an indication from the user of a selection of one of the presented plurality of messaging services; and
cause the mobile device to be connected to the selected one of the plurality of messaging services to enable the user to access messages that have not previously been accessed by the user.

2. The mobile device of claim 1, wherein the indication of the messaging service presented on the secondary display is an icon.

3. The mobile device of claim 1, wherein the indication of the messaging service presented on the secondary display is the name of the messaging service.

4. The mobile device of claim 1, wherein the plurality of messaging services are selected from the group consisting of email, voicemail, instant messaging, SMS messaging, and MMS messaging.

5. The mobile device of claim 1, wherein the plurality of messaging services are social networking services.

6. The mobile device of claim 1, wherein the secondary display is a touchscreen and wherein receiving an indication from the user of a selection of one of the presented plurality of messaging services comprises detecting a user's touch on the touchscreen in proximity to one of the presented plurality of messaging services on the touchscreen.

7. The mobile device of claim 1, further comprising a plurality of buttons adjacent to the secondary display.

8. The mobile device of claim 7, wherein receiving an indication from the user of a selection of one of the presented plurality of messaging services comprises detecting the selection of one of the plurality of buttons that is adjacent to a presented indication of one of the plurality of messaging services.

9. The mobile device of claim 1, wherein the secondary display is substantially coplanar with the primary display in the housing.

10. The mobile device of claim 1, wherein the secondary display is substantially perpendicular to the primary display in the housing.

11. The mobile device of claim 1, wherein the indication of the corresponding number of messages is presented numerically.

12. The mobile device of claim 1, wherein the indication of the corresponding number of messages is presented graphically.

13. The mobile device of claim 1, wherein the processor is further programmed to, upon the receipt of an indication of a new message via one of the plurality of messaging services, present on the secondary display a summary of the new message.

14. The mobile device of claim 13, wherein the summary of the new message is automatically scrolled across the secondary display.

15. The mobile device of claim 13, wherein the summary of the new message is a regarding (re:) line of the new message.

16. The mobile device of claim 13, wherein the processor is further programmed to, after presentation of the summary of the new message, present an interface to allow the user to send a responsive message to the new message.

17. A method of presenting the status of a plurality of messaging services to a user on a secondary display of a mobile device, the method comprising:
connecting with a plurality of messaging services that are accessible from a mobile device via a telecommunications network;
determining a number of messages that have not been accessed by a user at each of the plurality of messaging services,
wherein the number of messages is greater than one; and
for each of the plurality of messaging services, displaying on a secondary display of the mobile device an indication of the messaging service and an indication of the corresponding number of messages that have not been accessed by the user at the messaging service,
wherein the secondary display is not in a clamshell configuration with respect to the mobile device and,
wherein the displaying on the secondary display is performed without having to power on a primary display.

18. The method of claim 17, further comprising:
receiving an indication from the user of a selection of one of the presented plurality of messaging services; and
causing the mobile device to be connected to the selected one of the plurality of messaging services to enable the user to access messages that have not previously been accessed by the user.

19. The method of claim 17, wherein the indication of the messaging service displayed on the secondary display is an icon.

20. The method of claim 17, wherein the indication of the messaging service displayed on the secondary display is the name of the messaging service.

21. The method of claim 17, wherein the plurality of messaging services are selected from the group consisting of email, voicemail, instant messaging, SMS messaging, and MMS messaging.

22. The method of claim 17, wherein the plurality of messaging services are social networking services.

23. The method of claim 17, further comprising:
detecting when a user accesses a message that has not been previously accessed by the user; and
in response to detecting when a user accessed a message that has not been previously accessed, decrementing the displayed indication of the corresponding number of messages that have not been accessed by the user at the messaging service.

24. The method of claim 17, further comprising:
for each of the plurality of messaging services, determining a length of time that a message at the messaging service that has not been accessed by the user;
comparing the determined length of time with a threshold period; and
if the determined length of time exceeds the threshold period, decrementing the displayed indication of the corresponding number of messages that have not been accessed by the user at the messaging service.

25. The method of claim 17, wherein the indication of the corresponding number of messages is displayed numerically.

26. The method of claim 17, wherein the indication of the corresponding number of messages is displayed graphically.

27. The method of claim 17, further comprising:
   receiving an indication of the receipt of a new message via one of the plurality of messaging services; and
   displaying on the secondary display a summary of the new message.

28. method of claim 27, wherein the summary is scrolled across the secondary display.

29. The method of claim 17, further comprising, after displaying the summary of the new method, displaying an interface to allow the user to send a responsive message to the new message.

30. The mobile device of claim 1 wherein the secondary display is not in a clamshell configuration with respect to the mobile device, wherein the presentation on the secondary display is performed without having to power on the primary display, wherein the secondary display has a height and a width, and wherein a height-to-width or width-to-height ratio is 1 to 8.

31. The method of claim 17 wherein the secondary display has a height and a width, and wherein a height-to-width or width-to-height ratio is 1 to 8.

32. The method of claim 17, wherein the secondary display is smaller than the primary display, and wherein the secondary display is coplanar with, or in an offset, but parallel plane, to the primary display.

* * * * *

UNITED STATES PATENT AND TRADEMARK OFFICE
CERTIFICATE OF CORRECTION

| | |
|---|---|
| PATENT NO. | : 8,023,975 B2 |
| APPLICATION NO. | : 12/409473 |
| DATED | : September 20, 2011 |
| INVENTOR(S) | : Marianna Wickman et al. |

It is certified that error appears in the above-identified patent and that said Letters Patent is hereby corrected as shown below:

In column 13, line 22-23, in claim 1, delete "not previously been" and insert -- not been previously --, therefor.

In column 14, line 34, in claim 18, delete "not previously been" and insert -- not been previously --, therefor.

In column 15, line 8, in claim 28, before "method" insert -- The --.

Signed and Sealed this
Thirty-first Day of January, 2012

David J. Kappos
*Director of the United States Patent and Trademark Office*